United States Patent

Kono

[11] Patent Number: 5,370,329
[45] Date of Patent: Dec. 6, 1994

[54] SPINNING REEL FOR FISHING WITH DRAG MECHANISM AND DRAG INDICATOR

[75] Inventor: Chihiro Kono, Kanagawa, Japan
[73] Assignee: Daiwa Seiko, Inc., Tokyo, Japan
[21] Appl. No.: 187,132
[22] Filed: Jan. 27, 1994

Related U.S. Application Data

[63] Continuation of Ser. No. 894,855, Jun. 5, 1992, abandoned.

[30] Foreign Application Priority Data

Jul. 11, 1991 [JP] Japan ............... 3-061771[U]

[51] Int. Cl.⁵ .................................... A01K 89/027
[52] U.S. Cl. .................... 242/246; 116/309; 242/319
[58] Field of Search ............. 242/245, 246, 319; 116/309, 311, 318

[56] References Cited

U.S. PATENT DOCUMENTS

| | | | |
|---|---|---|---|
| 1,530,067 | 3/1925 | Young | 116/311 |
| 2,861,538 | 11/1958 | Evans | 116/315 X |
| 3,670,284 | 6/1972 | Fortier et al. | 116/311 X |
| 3,946,963 | 3/1976 | Oberg | 242/246 |
| 4,153,219 | 5/1979 | Kamikawa | 242/246 |
| 4,196,691 | 4/1980 | Imazeki | 116/309 |
| 5,096,138 | 3/1992 | L'Host et al. | 242/245 |
| 5,098,032 | 3/1992 | Toda | 242/246 X |
| 5,129,352 | 7/1992 | Roberts | 116/318 X |
| 5,149,007 | 9/1992 | Saito | 242/246 |

FOREIGN PATENT DOCUMENTS 48-50592 7/1973 Japan.

Primary Examiner—Daniel P. Stodola
Assistant Examiner—Michael R. Mansen
Attorney, Agent, or Firm—Longacre & White

[57] ABSTRACT

A drag mechanism for a spinning reel, in which a depressing member non-rotatably mounted on a front portion of a spool shaft and allowed to be moved in an axial direction relative thereto, is urged by a coiled spring against braking plates provided in a spool, and a drag force adjusting member rotatably mounted on the depressing member and prevented from falling off therefrom, is threadingly engaged with the spool shaft. Scales are provided on a surface of the depressing member facing the adjusting member, and a window hole through which the scales can be seen is provided on the adjusting member, thereby indicating the magnitude of the drag force set by rotating the adjusting member.

12 Claims, 3 Drawing Sheets

SPINNING REEL FOR FISHING WITH DRAG MECHANISM AND DRAG INDICATOR

This is a continuation of application Ser. No. 07/894,855, filed Jun. 5, 1992, which was abandoned upon the filing hereof.

BACKGROUND OF THE INVENTION

The present invention relates to an improvement for a drag mechanism provided in a spinning reel.

Japanese Utility Model Unexamined Publication (Kokai) No. Sho. 48-50592 discloses a conventional drag mechanism for a spinning reel. The drag mechanism includes a scale plate having scales on outer periphery thereof, which is non-rotatably fitted onto a spool shaft so as to be in contact with one of braking plates provided in a spool. The scale plate is depressed against the braking plates by a drag manipulator threadingly engaged with the spool shaft. In the drag mechanism, the drag force set by the drag manipulator is recognized by utilizing the scales and a support portion provided on the drag manipulator.

However, the conventional drag mechanism suffers from a problem in that since the scale plate is arranged to be separated from the drag manipulator and to be supported onto the spool shaft by the virtue of the depressing force of the drag manipulator, the support for the scale plate becomes unstable when the drag manipulator is loosened to decrease the depressing force thereof, so that it is difficult for a fisherman to recognize the drag force indicated by the scales on the scale plate. Further, during assembling the drag mechanism in a manufacturing line and/or disassembling the drag mechanism for interchange of a part, components parts are separated from each other, so that assembling and/or disassembling work becomes complicated. In a case where the scale plate is lost, the set value of the drag force cannot be recognized. Furthermore, dust, mucus of fish, or the like is likely to be adhered onto the indication part of the scale plate to make it harder for a fisherman to recognize the set value of the drag force.

SUMMARY OF THE INVENTION

The present invention was made in order to solve the problems noted above.

Accordingly, it is an object of the present invention is to provide a drag mechanism for a spinning reel where the set value of the drag force braking a spool can be easily and clearly recognized and the assembling and disassembling work can be performed with a simple manner.

In order to attain the above-noted and other objects, the present invention provides a drag mechanism for a spinning reel, comprising: a depressing member non-rotatably fitted onto a front portion of a spool shaft and movable in an axial direction relative to the spool shaft, having a first side and a second side opposite to the first side; a braking member provided on a spool, which is adapted to be depressed against the spool through the first side of the depressing member; a drag force adjusting member rotatably supported onto the second side of the depressing member and prevented from falling off therefrom, the drag force adjusting member being threadingly engaged with the spool shaft; and indication means for indicating an amount of rotation of the drag force adjusting member relative to the depressing member.

The present invention further provides a drag mechanism for a spinning reel, comprising: a spool shaft; a spool rotatably mounted onto the spool shaft; braking means comprising brake plates mounted on the spool shaft for braking the rotation of the spool with respect to the spool shaft; depressing means non-rotatably mounted on the spool shaft for urging the brake plate along the spool shaft and against the spool, the depressing means comprising a pressure member for contacting the brake plates; braking force adjusting means for controlling the braking of the brake plates against the spool, the adjusting means comprising a control knob which is threadingly engaged with an end of the spool shaft and rotatable relative to the pressure member; means for coupling the pressure member and the control knob as a unit so as to allow mutual rotation therebetween; scales formed on a portion of the pressure member facing the control knob; and a window hole formed on and passing through the control knob, through which at least one of the scales can be seen.

The coupling means may include screws secured to the control knob, the screw having head portions for supporting the pressure member.

The drag mechanism may further comprises engagement means for preventing free rotation between the pressure member and the control knob.

BRIEF DESCRIPTION OF THE DRAWINGS

In the accompanying drawings:

FIG. 4 is a side view showing the drag mechanism shown in FIG. 3a.

DETAILED DESCRIPTION OF THE PREFERRED EMBODIMENTS

Figure 1:
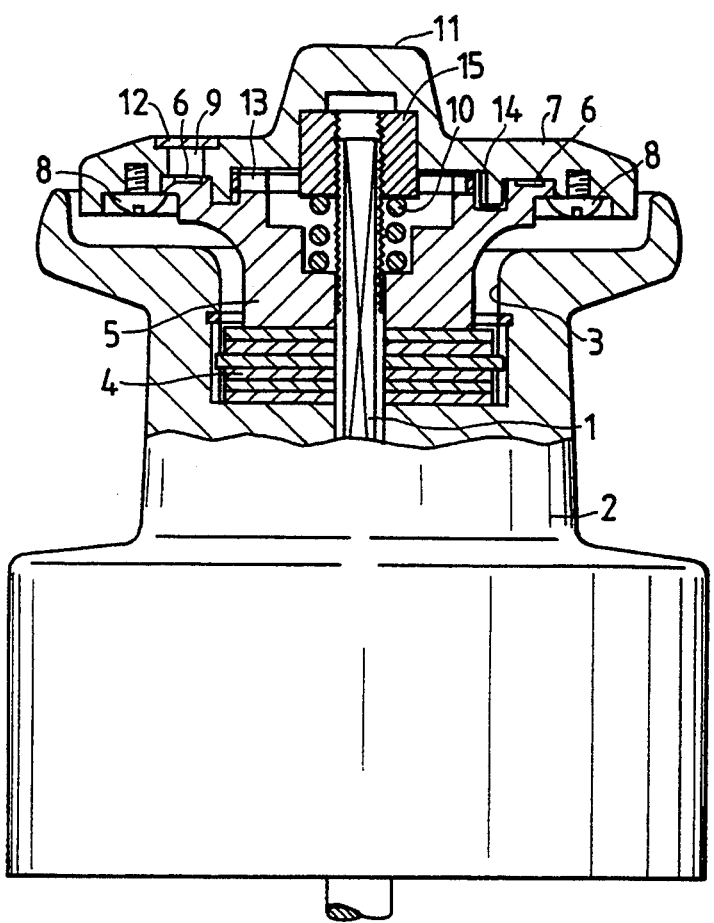
FIG. 1 is a partially sectional front view showing a drag mechanism for a spinning reel according to an embodiment of the present invention.
Figure 2:
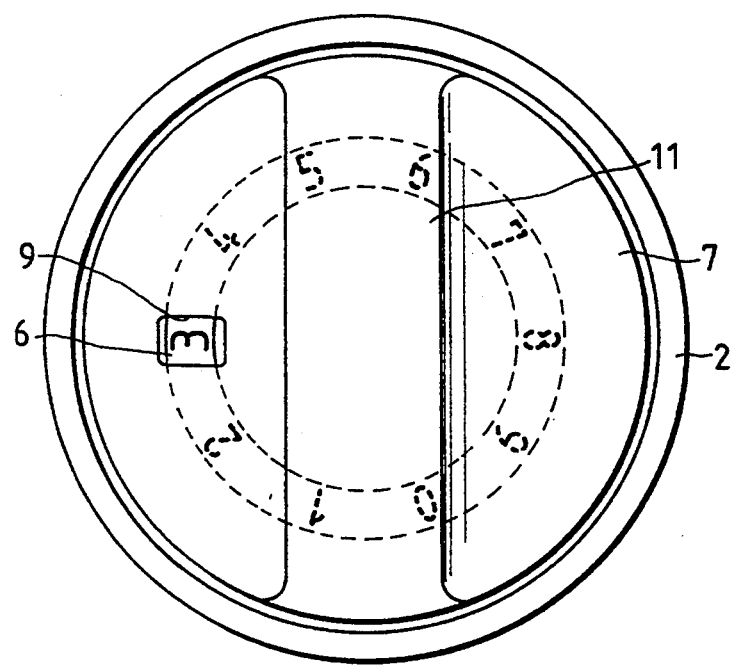
FIG. 2 is a side view showing the drag mechanism.

A drag mechanism for a spinning reel according to an embodiment of the present invention will now be described in detail with reference to FIGS. 1 and 2.

A spool 2 is rotatably mounted onto a spool shaft 1, and formed at its front portion (upper portion in FIG. 1) thereof with a recess 3 as conventionally know. A plurality of braking plates 4 are fittingly inserted into the recess 3 such that some of the braking plates are engaged with the spool 2 and the other of the braking plates are engaged with the spool shaft 1. A depressing member or pressure member 5 is non-rotatably mounted onto the spool shaft 1 and movable in an axial direction relative to the spool shaft 1. The depressing member 5 is brought into contact with the uppermost one of the braking plates 4.

The depressing member 5 is provided with scales 6 comprised of numerals, alphabets, symbols, figures, or the like on a front portion near a periphery thereof. A drag force adjusting member or control knob 7 adapted to be threading engaged with a front end portion of the spool shaft 1 is rotatably supported onto a flange portion of the depressing member 5 through retaining screws 8. The drag force adjusting member 7 has a window hole 9 through which scales 6 on the depressing member 5 can be observed and confirmed. A transparent plate member 12 is attached onto the drag force adjusting member 7 to cover the window hole 9 in this embodiment. The transparent plate 12 is made of synthetic resins, glass or the like. The window hole 9 may be filed with a transparent material. Provided between the depressing member 5 and the drag force adjusting member 7 is a coiled spring 10 for urging the depressing member into pressure-contact with the braking plates 4 so that the braking force is applied onto the spool 2. More specifically, the coiled spring 10 is interposed between the depressing member 5 and a nut 15 threadingly engaged with the spool shaft 1. The nut 15 is non-rotatably inserted into a recess portion of the drag force adjusting member 7 so as to be movable relative to the drag force adjusting member 7 in an axial direction thereof. When the drag force adjusting member 7 is rotated to increase the drag force, the nut 15 is moved toward the depressing member 6 due to the threaded engagement between the nut 15 and the spool shaft 1, to thereby compress the coiled spring 10. Accordingly, the depression of the depressing member 6 against the braking plates 4 is increased to increase the drag force.

A spring member 13 mounted on the depressing member 5 is engaged with an engaging undulated part 14 foraged on an inner cylindrical surface of the drag force adjusting member 7 so as to prevent free rotation between the depressing member 5 and the drag force adjusting member 7. In addition, reference numeral 11 designates a manipulator for rotating the drag force adjusting member 7.

By rotating the drag force adjusting member 7, the depressing member 5 is moved forward or backward in the axial direction of the spool shaft so that the magnitude of the depression of the member 5 against the braking plates can be adjusted. In this adjustment operation, the depressing member 5 and the drag force adjusting member 7 is mutually rotated in relation to an amount of the axial movement of the depressing member 5 so that the set value of the drag force for braking the spool can be observed and confirmed by the scales 6 indicated through the window hole 9.

In this embodiment, head portions of the screw 8 are utilized as a means for rotatably coupling the depressing member 5 to the drag force adjusting member 7. However, the depression member 5 may be rotatably supported onto the drag force adjusting member 7 with utilizing caulking, depositing, or the like on portions corresponding to the head portions of the screws.

Figure 3A:
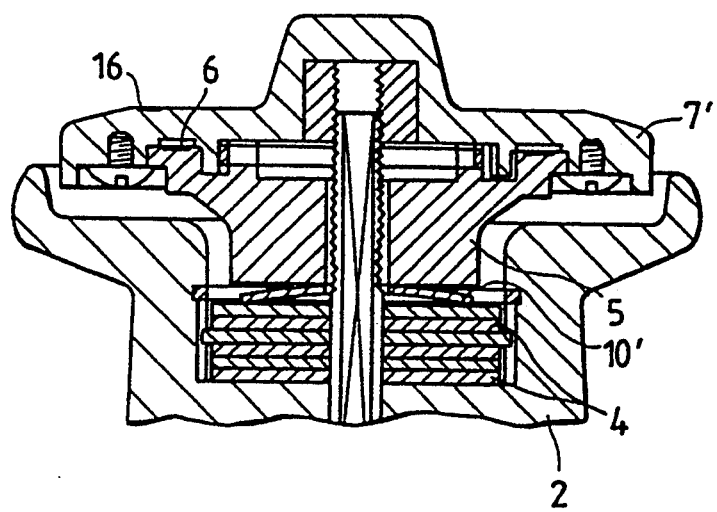
FIGS. 3a and 3b are a sectional front views showing a drag mechanism for a spinning reel according to other embodiments of the present invention.
Figure 3B:
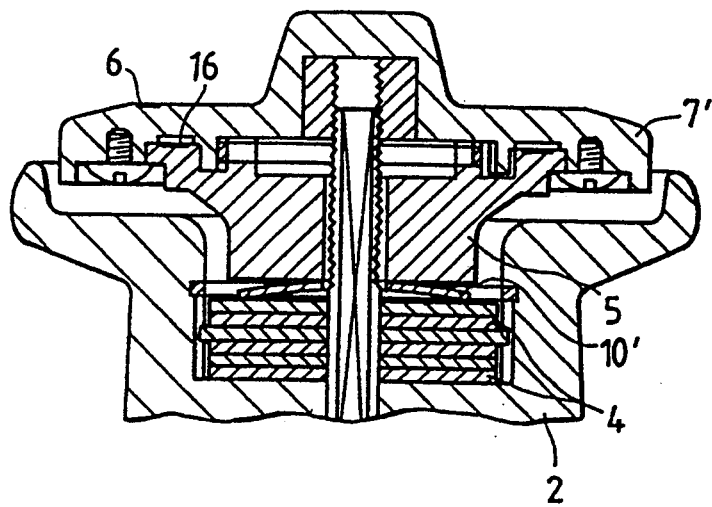
Figure 4:
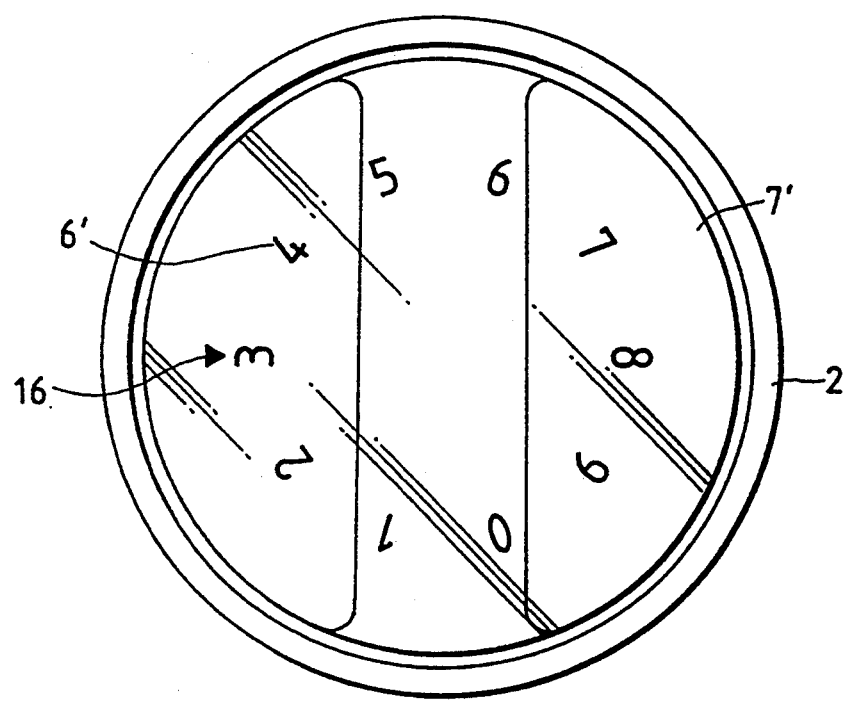

FIGS. 3a, 3b and 4 show a drag mechanism for a spinning reel according to another embodiment of the present invention.

In this embodiment, a drag force adjusting member 7' made of transparent material is provided, through which scales 6 on the depressing member 5 can be seen. The entire body of the drag force adjusting member 5 may be formed of the transparent material, or otherwise, a portion of the drag force adjusting member 5, facing the scales 6 during the rotation of the drag force adjusting member, may be formed of the transparent material. Further, provided on the drag force adjusting member 7' is a marker 16 for indicating an amount of rotation of the drag force adjusting member 7' relative to the depressing member 5 with the scales 6 used through the transparent adjusting member 7'. Since the drag force adjusting member 7' is transparent, the marker 16 and the scales 6 may be provided on the depressing member 5 and the adjusting member 7', respectively (FIG. 3b). In this embodiment, a spring member 10' for depressing the braking plates 4 is interposed between the depressing member 5 and the uppermost braking plate 4. In addition, the spring member 10' may be interposed between the lowermost braking plate 4 and a bottom of the recess formed in the spool 2.

According to the present invention, a drag force adjustment member adapted to be threadingly engaged with a spool shaft is rotatably coupled to and prevented from falling off from a depression member adapted to be non-rotatably and axially-movably mounted onto a spool shaft. Further, scales and a window hole are formed on the depressing member and the drag force adjusting member, respectively. Therefore, the magnitude of the drag force set by rotating the drag force adjusting men, bet can be indicated by the scales which can be seen through the window hole, and the indication by the scales and the window becomes stable regardless of the magnitude of the drag force to make it easier for a fisherman to recognize the magnitude of the drag force rapidly. Further, since the depressing member and the drag force adjusting member are coupled to each other as a unit construction, they can easily be attached to and detached from the spool shaft. Thus, the assembling and disassembling work can be performed with a simple manner, and the lost of a scale plate as in a conventional drag mechanism can be surely prevented. Furthermore, in a case where a transparent plate is attached onto the drag force adjusting member for sealing the window hole, the dust, the mucus of fish, or the like can be prevented from being adhered onto portions of the depressing men%bet where scales are provided, to make it easier for a fisherman to observe and confirm the magnitude of the drag force at any time.

What is claimed is:

1. A drag mechanism for a spinning reel, comprising:
   a spool shaft;
   a spool rotatably mounted onto said spool shaft;
   a pressing member non-rotatably fitted onto a front portion of the spool shaft and movable in an axial direction relative to the spool shaft, said pressing member having a first side and a second side opposite to said first side;
   a braking member provided on said spool, said braking member is depressed against said spool by said first side of said pressing member;
   a drag force adjusting member relatively rotatably supported on said second side of said pressing member and prevented from separating therefrom, said drag force adjusting member being threadingly engaged with said spool shaft; and
   indication means for indicating an amount of rotation of said drag force adjusting member relative to said pressing member, said indication means is at least partially located at an interface of said second side with said drag force adjusting member and includes transparent material through which said indication means is viewed.

2. The drag mechanism according to claim 1, wherein said indication means includes scales provided on said second side and a indication portion provided on said drag force adjusting member for indicating at least one of said scales in accordance with said amount of rotation.

3. The drag mechanism according to claim 1, wherein said indication means includes a marker provided on said second side of said depressing member, said drag force adjusting member facing said marker during rotation of said drag force adjusting member, and scales provided on said drag force adjusting member to indicate said amount of rotation by utilizing said marker through said drag force adjusting member.

4. The drag mechanism according to claim 1, further comprising:
spring means for urging said depressing member in an axial direction of said spool shaft toward said braking member.

5. The drag mechanism according to claim 4, wherein said spring means includes a coiled spring interposed between said depressing member and said drag force adjusting member.

6. The drag mechanism according to claim 1, further comprising:
coupling means for preventing said drag force adjusting member and said pressing member from relatively separating, said coupling means independently maintains said drag force adjusting member and said pressing member as a unit.

7. A drag mechanism for a spinning reel, comprising:
a spool shaft;
a spool rotatably mounted onto said spool shaft;
braking means comprising brake plates mounted on said spool shaft for braking the rotation of said spool with respect to said spool shaft, said braking means being partially received in said spool;
depressing means non-rotatably mounted on said spool shaft for urging said brake plate along said spool shaft and against said spool, said depressing means comprising a pressure member for contacting said brake plates, said pressure plate being partially received in said spool;
braking force adjusting means for controlling the braking of said brake plates against said spool, said adjusting means comprising a control knob which is threadingly engaged with an end of said spool shaft and rotatable relative to said pressure member;
means for coupling said pressure member to said control knob so as to allow mutual rotation therebetween, said coupling means independently maintains said control knob and said pressure member as a unit;
scales formed on a portion of said pressure member facing said control knob; and
a window hole formed on and passing through said control knob, through which at least one of said scales can be seen.

8. The drag mechanism according to claim 7, wherein said coupling means includes screws secured to said control knob, said screw having head portions for supporting said pressure member.

9. The drag mechanism according to claim 7, further comprising:
a transparent plate attached onto said control knob to cover said window hole.

10. The drag mechanism according to claim 7, further comprising:
engagement means for preventing free rotation between said pressure member and said control knob.

11. The drag mechanism according to claim 7, wherein said braking means comprises a plurality of braking plates fittingly inserted into a recess provided in said spool.

12. The drag mechanism according to claim 7, wherein said braking plates comprises first plates engaged with said spool and second plates engaged with said spool shaft.

* * * * *